(12) United States Patent
Smith

(10) Patent No.: US 10,892,610 B2
(45) Date of Patent: Jan. 12, 2021

(54) ADJUSTABLE TRANSITION COUPLER

(71) Applicant: Bridgeport Fittings, LLC, Stratford, CT (US)

(72) Inventor: Lawrence J. Smith, Stamford, CT (US)

(73) Assignee: Bridgeport Fittings, LLC, Stratford, CT (US)

( * ) Notice: Subject to any disclaimer, the term of this patent is extended or adjusted under 35 U.S.C. 154(b) by 0 days.

(21) Appl. No.: 16/426,080

(22) Filed: May 30, 2019

(65) Prior Publication Data

US 2020/0381908 A1    Dec. 3, 2020

(51) Int. Cl.
*H02G 3/06* (2006.01)

(52) U.S. Cl.
CPC ......... *H02G 3/0683* (2013.01); *H02G 3/0691* (2013.01)

(58) Field of Classification Search
CPC combination set(s) only.
See application file for complete search history.

(56) References Cited

U.S. PATENT DOCUMENTS

| | | | | |
|---|---|---|---|---|
| 1,535,098 A | * | 4/1925 | Buckingham | G01B 3/48 33/199 R |
| 1,794,849 A | * | 3/1931 | Hagstedt | H02G 3/06 285/149.1 |
| 2,024,862 A | * | 12/1935 | Hooley | H02G 3/06 174/100 |
| 2,062,400 A | * | 12/1936 | Dann | H02G 3/0616 277/623 |
| 2,920,305 A | * | 1/1960 | Gibson | H01R 4/36 439/814 |
| 2,938,742 A | * | 5/1960 | Teator | H02G 3/0683 285/149.1 |
| 3,174,776 A | * | 3/1965 | Berger | F16L 41/08 285/154.4 |
| 3,448,519 A | * | 6/1969 | Tobias | B26B 5/005 30/293 |
| 3,567,843 A | * | 3/1971 | Collins | H02G 3/0616 174/51 |
| 3,627,904 A | * | 12/1971 | Milne | H02G 3/0683 174/83 |
| 3,643,290 A | * | 2/1972 | Milne | F16L 41/08 16/2.1 |

(Continued)

*Primary Examiner* — Jenny L Wagner
*Assistant Examiner* — Krystal Robinson
(74) *Attorney, Agent, or Firm* — Ware, Fressola, Maguire & Barber LLP

(57) ABSTRACT

An adjustable transition coupler for coupling AC/MC to conduit, the coupler having a body with a hollow cylindrical section and an extension member with a curved section, the cylindrical section having a slot to allow passage of a stop plate. The coupler has an insulator with a hollow bushing at one end for insertion into a cavity of the cylindrical section and a stop plate extending radially outward, the stop plate movable by an adjustment screw between minimum and maximum deflections. The stop plate stops AC/MC from passage into the cylindrical section. The hollow bushing stops the conduit positioned in the hollow cylindrical section from passage into the extension member. The coupler has a strap with a curved section complementary with the curved section of the extension member so as to secure a range of AC having different outer sheath diameters.

12 Claims, 14 Drawing Sheets

(56) References Cited

U.S. PATENT DOCUMENTS

| | | | | |
|---|---|---|---|---|
| 4,382,678 | A * | 5/1983 | Thompson | G01C 11/04 33/1 A |
| 4,451,993 | A * | 6/1984 | Yauk | B43L 7/005 33/472 |
| 4,536,613 | A * | 8/1985 | Gallas | H02G 3/0691 174/660 |
| 4,641,863 | A * | 2/1987 | Shemtov | H02G 3/0683 285/154.4 |
| 4,995,647 | A * | 2/1991 | Carey | F16L 3/04 174/663 |
| 5,789,706 | A * | 8/1998 | Perkins | H02G 3/0691 174/135 |
| 6,064,009 | A * | 5/2000 | Jorgensen | H02G 3/0666 174/135 |
| 6,140,582 | A * | 10/2000 | Sheehan | H02G 3/0683 16/2.1 |
| 6,604,400 | B1 * | 8/2003 | Gretz | H02G 3/0691 174/659 |
| 7,485,806 | B1 * | 2/2009 | Gretz | H02G 3/0666 174/135 |
| 7,563,100 | B1 | 7/2009 | Smith | |
| 7,883,338 | B2 | 2/2011 | Smith | |
| 7,952,034 | B2 * | 5/2011 | Kiely | H02G 3/0683 174/650 |
| 8,007,284 | B2 | 8/2011 | Smith | |
| 8,129,634 | B2 * | 3/2012 | Sheehan | H02G 3/0625 174/666 |
| D689,026 | S | 9/2013 | Smith | |
| D691,693 | S | 10/2013 | Smith | |
| D702,542 | S * | 4/2014 | Smith | H02G 3/06 D8/396 |
| 8,690,194 | B1 * | 4/2014 | Smith | F16L 25/065 285/149.1 |
| 9,343,883 | B2 | 5/2016 | Decesare et al. | |
| 9,373,919 | B1 * | 6/2016 | Smith | H02G 3/0683 |
| 9,705,295 | B1 * | 7/2017 | Smith | H02G 3/0616 |
| 9,787,070 | B2 | 10/2017 | Decesare et al. | |
| 10,056,746 | B1 | 8/2018 | Smith | |
| D838,676 | S | 1/2019 | Smith | |
| D840,948 | S | 2/2019 | Smith | |
| D843,952 | S | 3/2019 | Smith | |
| 10,240,694 | B2 | 3/2019 | Decesare et al. | |
| D845,251 | S | 4/2019 | Smith | |
| 2008/0277160 | A1 * | 11/2008 | Auray | F16L 5/00 174/659 |
| 2011/0162220 | A1 * | 7/2011 | Vogeler | B26D 7/0006 33/27.03 |
| 2011/0290550 | A1 * | 12/2011 | Kiely | H02G 3/0691 174/480 |
| 2011/0309611 | A1 * | 12/2011 | Smith | H02G 3/065 285/139.3 |
| 2012/0086196 | A1 * | 4/2012 | Smith | H02G 3/06 285/31 |
| 2016/0025454 | A1 * | 1/2016 | Meinert | F41G 1/387 42/71.01 |
| 2016/0061367 | A1 * | 3/2016 | Smith | F16L 21/08 285/179.1 |
| 2017/0144171 | A1 * | 5/2017 | Ewer | A61K 35/19 |

* cited by examiner

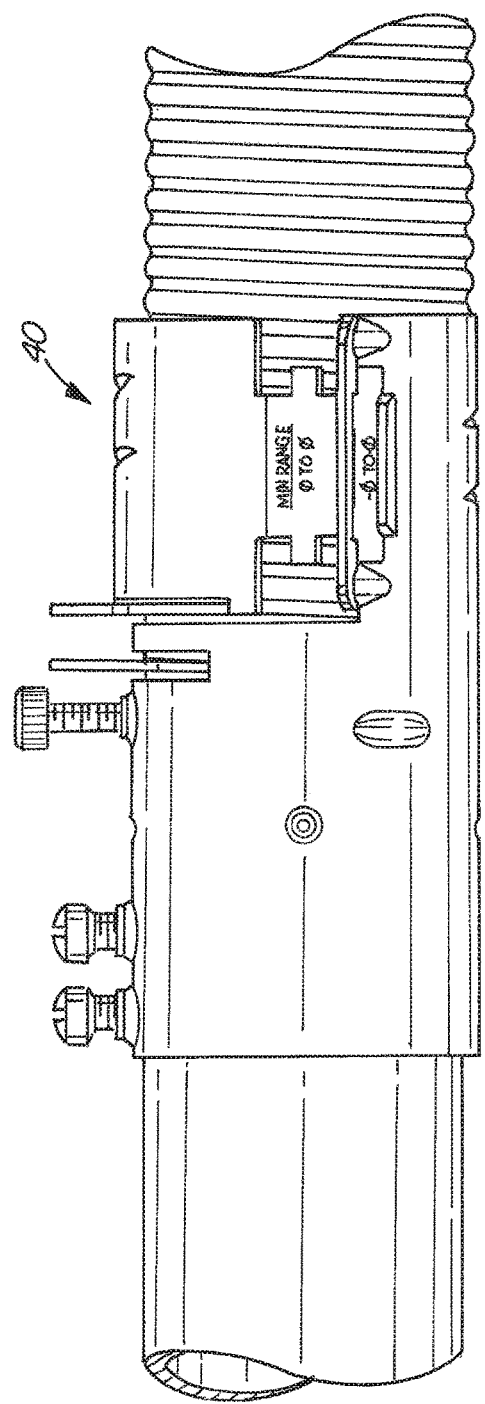
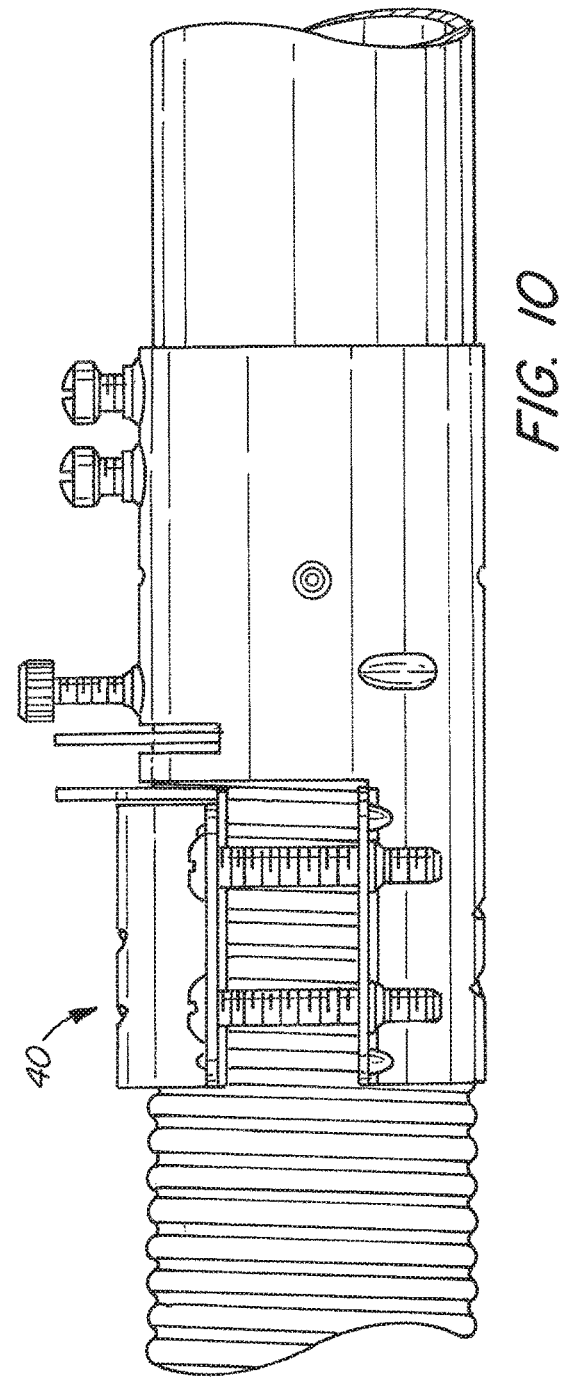

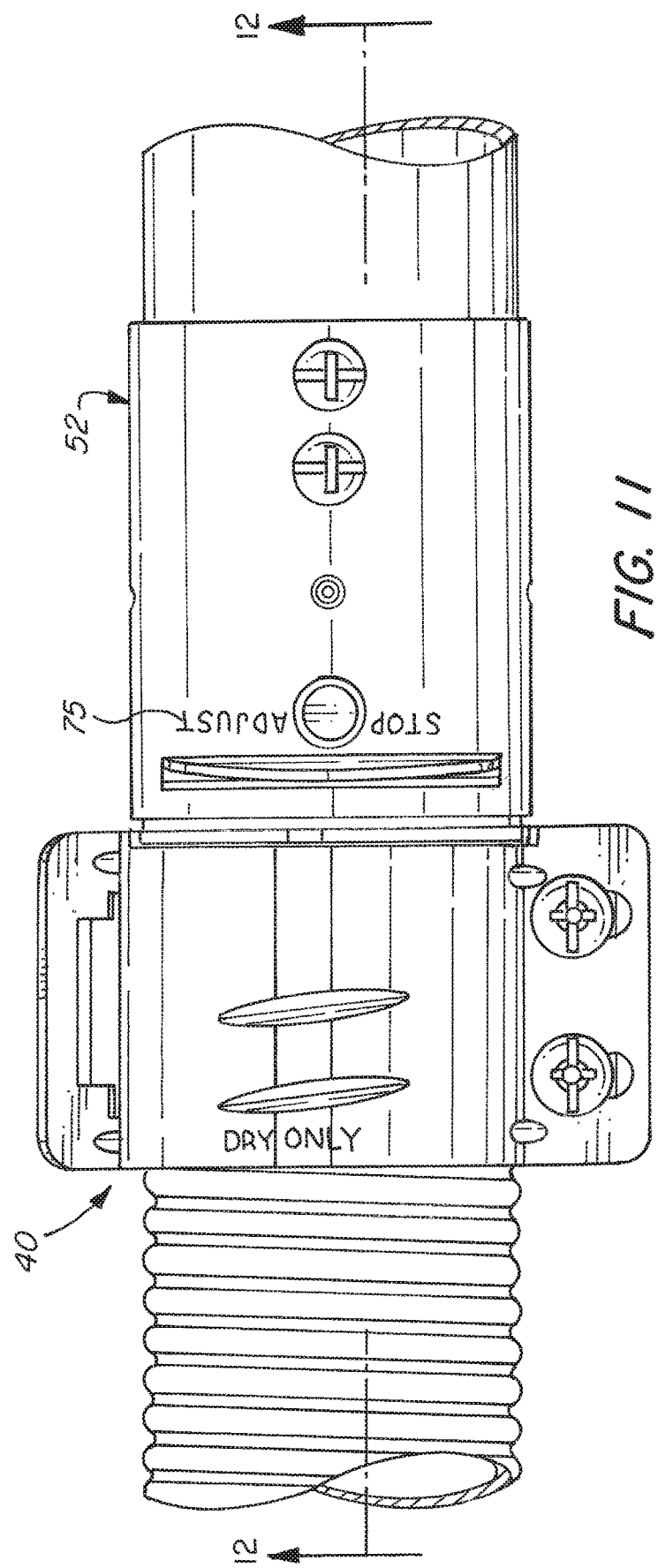

ADJUSTABLE TRANSITION COUPLER

TECHNICAL FIELD

The present invention relates to transition couplers, in particular, an adjustable transition coupler for coupling armored cable (AC), or metal clad cable (MC) to either electrical metallic tubing (EMT) or rigid conduit. Furthermore, the adjustable transition coupler incorporates an adjustable stop.

BACKGROUND OF THE INVENTION

In the electrical fitting art, there are many different styles of couplers for coupling, for example, armored cable (AC) or metal clad (MC) to electrical metal tubing (EMT) or rigid conduit. AC typically has an outer sheath made from steel while MC typically has an outer sheath made from aluminum. Both AC and MC include multiple electrical conductors, including a ground/bond conductor. AC and MC have outer sheaths of various diameters. Over recent years, there has been an increase in large metal clad cable (MC) sizes used typically for electrical feeder circuits in commercial buildings and the like and this increased usage has created a need to expand coupler fitting trade sizes. As a result of these larger MC sizes, many different fittings would normally be required to handle the specific metal clad outer sheath diameter (OD) ranges for AC and MC.

In addition, different manufacturers of AC and MC may use a different outer diameter to its metal outer sheath and/or may use a different electrical conductor bundle configuration, all of which complicate the selection of the coupler. Furthermore, various standards organizations, including Underwriter's Laboratories, have issued standards, such as UL514B, that requires any AC/MC (armored cable/metal clad cable) coupler to physically prevent the metal outer sheath from passing through the coupler, thereby preventing the sheath from passing into the other side of the coupler. Of course, the coupler must also allow the conductor bundle within the AC/MC to readily pass through the coupler without damage so as to then pass through the electrical metallic tubing (EMT) or rigid conduit secured to the other side of the coupler.

SUMMARY OF THE INVENTION

The present invention is directed to a new transition coupler which is able to accommodate AC/MC having an outer sheath in a range of outer diameters (ODs), and couple this AC/MC to EMT or rigid conduit. The coupler, by accepting a range of OD sizes, reduces installation time.

The present invention relates to an adjustable transition coupler for coupling armored cable (AC) or metal clad cable (MC), the AC/MC having an outer sheath in a range of outer diameters, to either electrical metallic tubing (EMT) or rigid conduit, the transition coupler comprising a body with a hollow cylindrical section and an extension member attached to the hollow cylindrical section, the hollow cylindrical section having a slot dimensioned to allow passage of a stop plate, a first threaded bore passing through the hollow cylindrical section for receipt of an adjustment screw, and at least a second threaded bore for receipt of a screw so as to secure EMT/rigid conduit in a cavity of the hollow cylindrical section, the extension member comprising a first flange with threaded bores formed therein, a curved section attached to the flange at one end of the curved section, and a second flange attached to the curved section at a second end of the curved section, the second flange having a slot formed therethrough, an insulator having a hollow cylindrical bushing at one end dimensioned to be inserted into the cavity of the hollow cylindrical section of the body, a curved member flexibly attached to the hollow cylindrical bushing, the curved member extending to a second end of the insulator, and a stop plate extending radially outward from the curved member at said second end of the insulator, the stop plate dimensioned for passage in said slot of the body, the stop plate movable by the adjustment screw between a minimum deflection and a maximum deflection, the stop plate configured to stop the AC/MC from passage into the hollow cylindrical section of the body when the AC/MC is positioned in the extension member of the body; wherein the hollow cylindrical bushing of the insulator is configured to stop the EMT or rigid conduit positioned in the hollow cylindrical section of the body from passage into the extension member, and a strap having a flange with slots formed therein, each slot dimensioned to allow passage of a screw for threaded engagement with one of the threaded bores formed in the first flange of the extension member, a curved section having a first end attached to the strap flange, the curved section complementary to the curved section of the extension member, and a strap adjustment member attached to a second end of the strap curved section, the strap adjustment member having a plurality of fingers extending therefrom, the fingers arranged in pairs, each pair of fingers dimensioned so as to be able to pass through the slot of the second flange of the extension member so as to prevent the strap adjustment member from disengaging from said slot, wherein the curved section of the extension member and the curved section of the strap are configured to secure the AC/MC cable, where the AC/MC outer sheath may have different outer diameter sizes in said range of outer diameters.

Another embodiment of the present invention is the adjustable transition coupler as described above, wherein the curved member of the insulator includes a recess dimensioned for contact with an end of the adjustment screw to facilitate deflection of the stop plate by deflection of the curved member.

Another embodiment of the present invention is the adjustable transition coupler as described above, wherein the body and strap are fabricated from steel or zinc.

A further embodiment of the present invention is the adjustable transition coupler as described above, wherein the strap adjustment member of the strap includes indicia indicating a maximum and minimum range of sheath outer diameter sizes associated with an AC/MC that can be connected to the electrical connector.

A further embodiment of the present invention is the adjustable transition coupler as described above, wherein the curved section of the extension member and the curved section of the strap each include detents for facilitating securement to the outer sheath of the AC/MC.

Another embodiment of the present invention is the adjustable transition coupler as described above, wherein the curved section of the strap includes an upstanding flange protruding radially outward from one end of the curved section so as to help prevent entry of extraneous material into the cavity of the hollow cylindrical section of the body of the coupler when the strap is adjusted between a maximum and minimum outer diameter for the associated AC/MC.

Another embodiment of the present invention is the adjustable transition coupler as described above, wherein the strap adjustment member includes a lip extending from an end of the strap adjustment member, the lip to facilitate preventing the strap adjustment member from pulling out of the slot in the second flange of the body during adjustment of the strap.

Another embodiment of the present invention is the adjustable transition coupler as described above, wherein the stop plate includes indicia indicating the amount of deflection of the stop plate.

A further embodiment of the present invention is the adjustable transition coupler as described above, wherein the insulator is fabricated form an electrical insulating material.

A further embodiment of the present invention is the adjustable transition coupler as described above, wherein the electrical insulating material is polypropylene or nylon.

Another embodiment of the present invention is the adjustable transition coupler as described above, wherein the hollow cylindrical section of the body has indicia near the first threaded bore to identify the adjustment screw.

A further embodiment of the present invention is the adjustable transition coupler as described above, wherein the adjustment screw is a thumb adjustment screw.

Another embodiment of the present invention is the adjustable transition coupler as described above, wherein the curved member of the insulator includes depending ears configured to contact dimples protruding inside the hollow cylindrical section of the body when the stop plate is at the maximum deflection.

BRIEF DESCRIPTION OF THE DRAWINGS

For a fuller understanding of the nature and objects of the present invention, reference is made to the following detailed description taken in conjunction with the following drawings in which:

FIG. 9 is a left side view of the transition coupler showing AC/MC with a maximum outer diameter metal sheath and an EMT/rigid conduit secured to the coupler.

FIG. 10 is a right side view of the transition coupler, AC/MC and EMT/rigid conduit as shown in FIG. 9.

FIG. 11 is a top view of the transition coupler, AC/MC and EMT/rigid conduit shown in FIG. 9.

DETAILED DESCRIPTION

Figure 1:
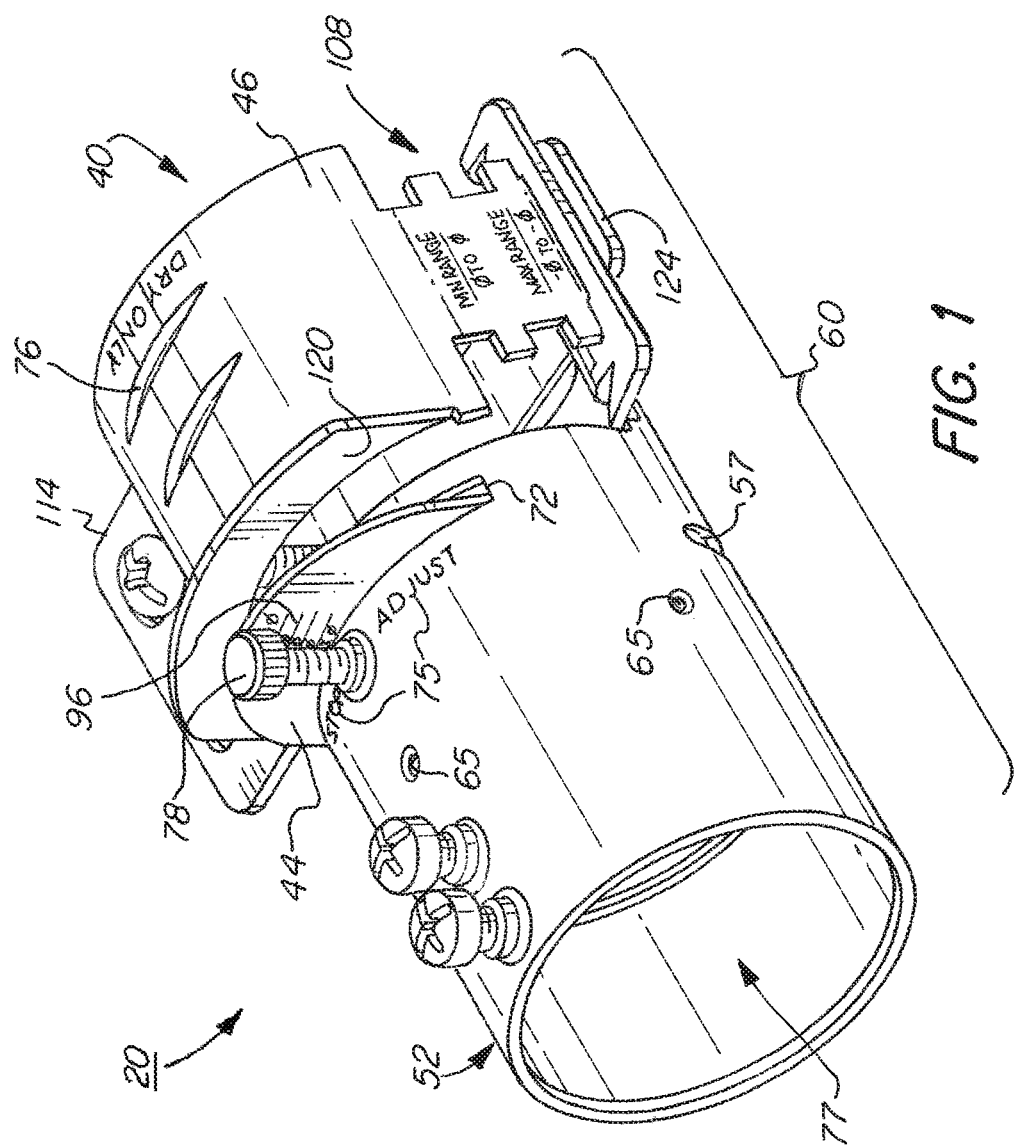
FIG. 1 is a perspective view of a transition coupler for coupling armored cable (AC) or metal clad cable (MC) to either electrical metallic tubing (EMT) or rigid conduit according to an embodiment of the present invention.
Figure 2:
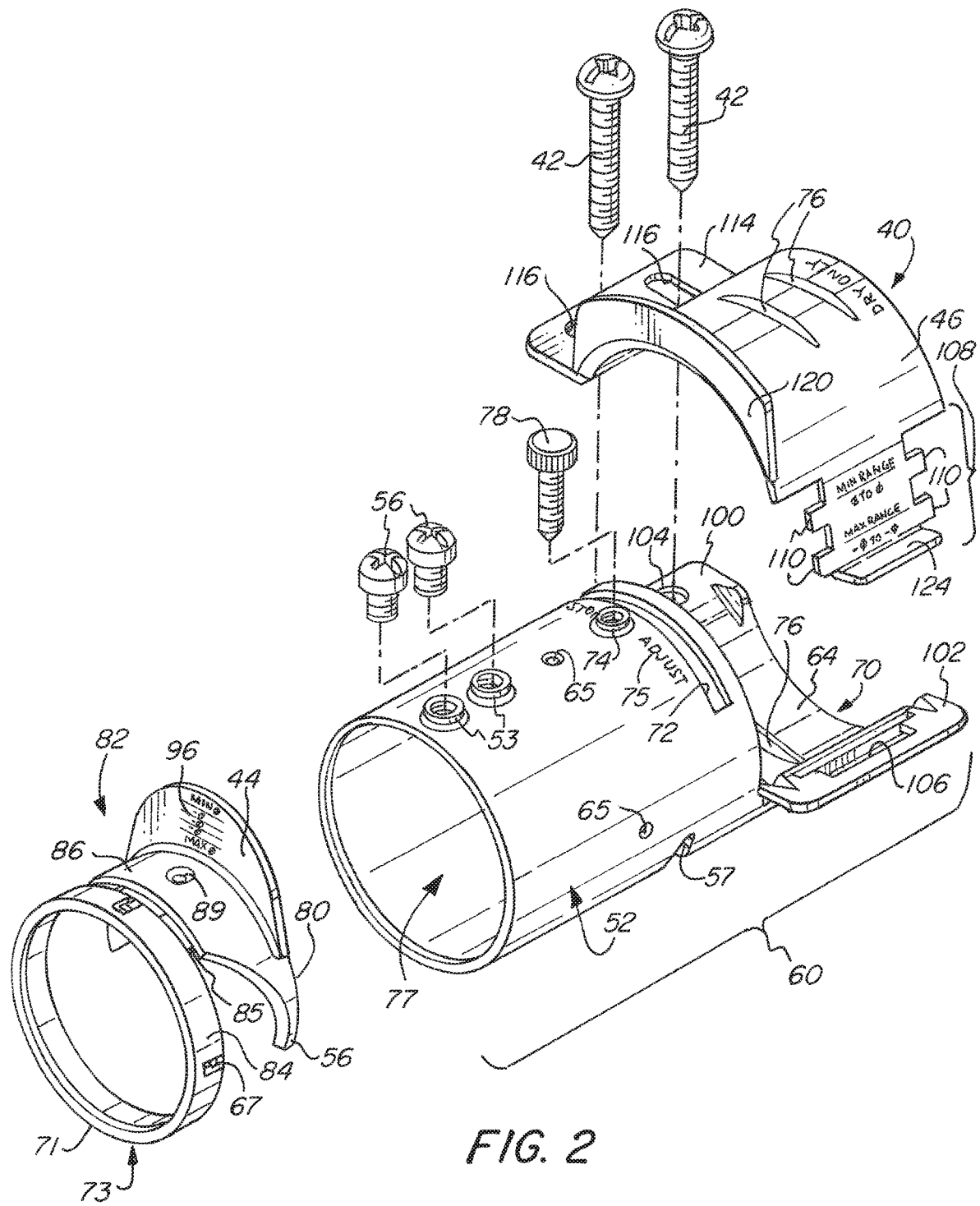
FIG. 2 is an exploded perspective view of the transition coupler shown in FIG. 1, including an insulator with an adjustable stop plate.
Figure 2A:
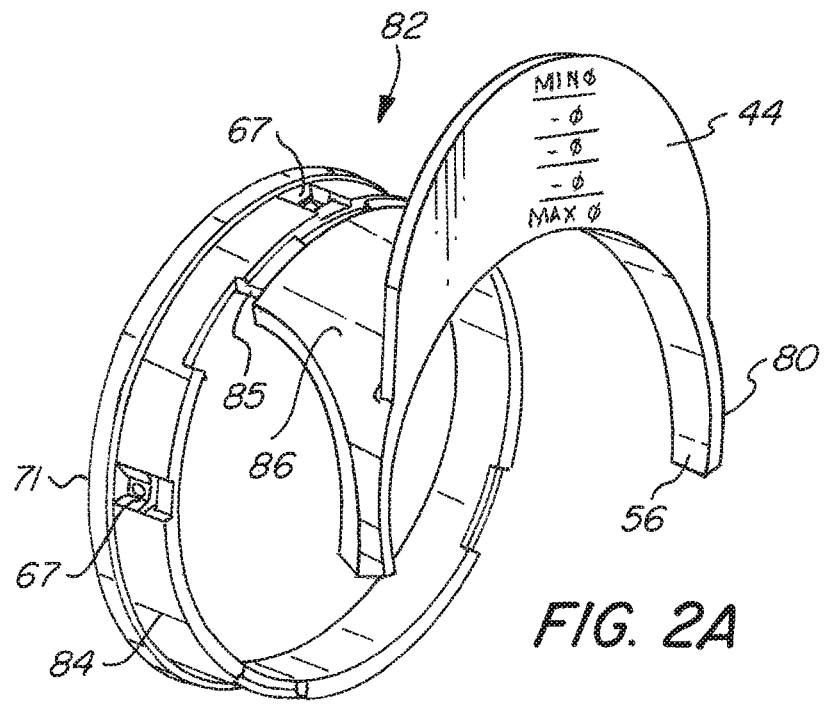
FIG. 2A is an enlarged perspective view of the insulator with its adjustable stop plate shown in FIG. 2.
Figure 2B:
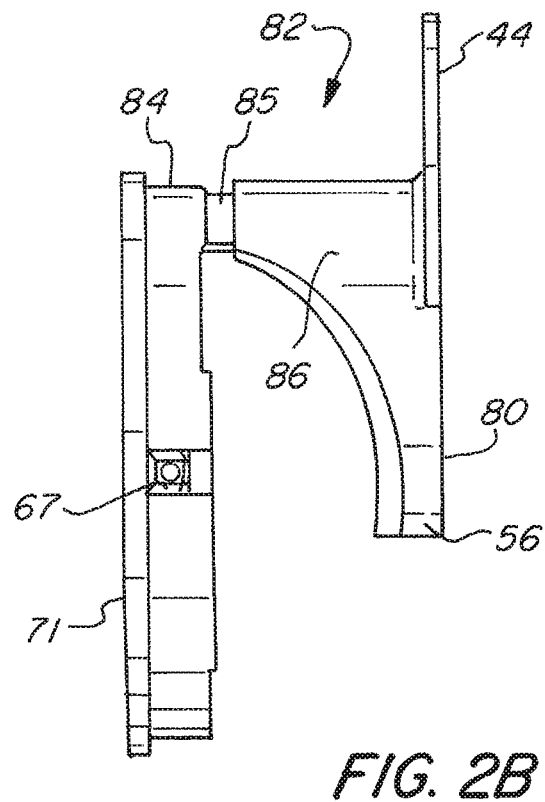
FIG. 2B is an enlarged side view of the insulator shown in FIG. 2A.

FIGS. 1 and 2 respectively show an assembled view and an exploded view of an adjustable transition coupler 20 for coupling armored cable (AC) or metal clad cable (MC) 30 to either electrical metallic tubing (EMT) 24 or rigid conduit 24.

As will be explained below, the transition coupler includes a body 60 and a strap 40. The body has a hollow cylindrical section 52 and an extension member 70. As seen in FIGS. 9-15, the cylindrical section is configured to secure AC/MC 30 having various outer sheath diameters and the extension member and strap are configured to secure EMT/rigid conduit of various sizes. The body and the strap may be fabricated from steel or zinc, for example.

Figure 13:
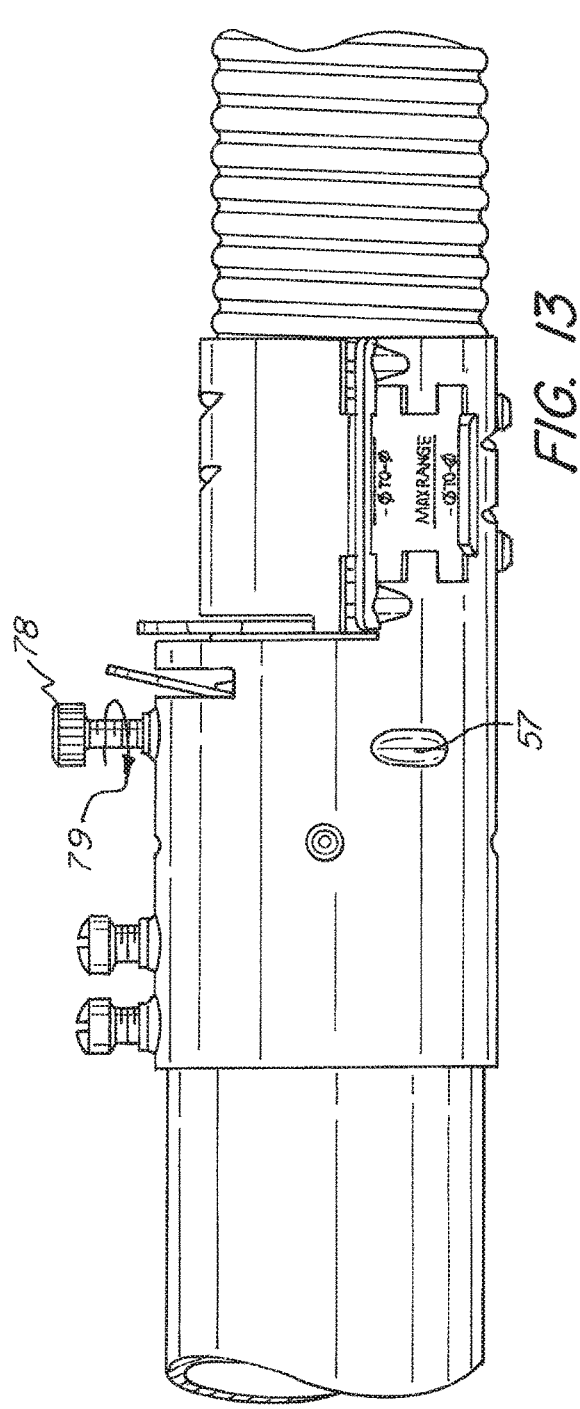
FIG. 13 is a left side view of the transition coupler showing AC/MC with a minimum outer diameter metal sheath and EMT/rigid conduit secured to the coupler.
Figure 14:
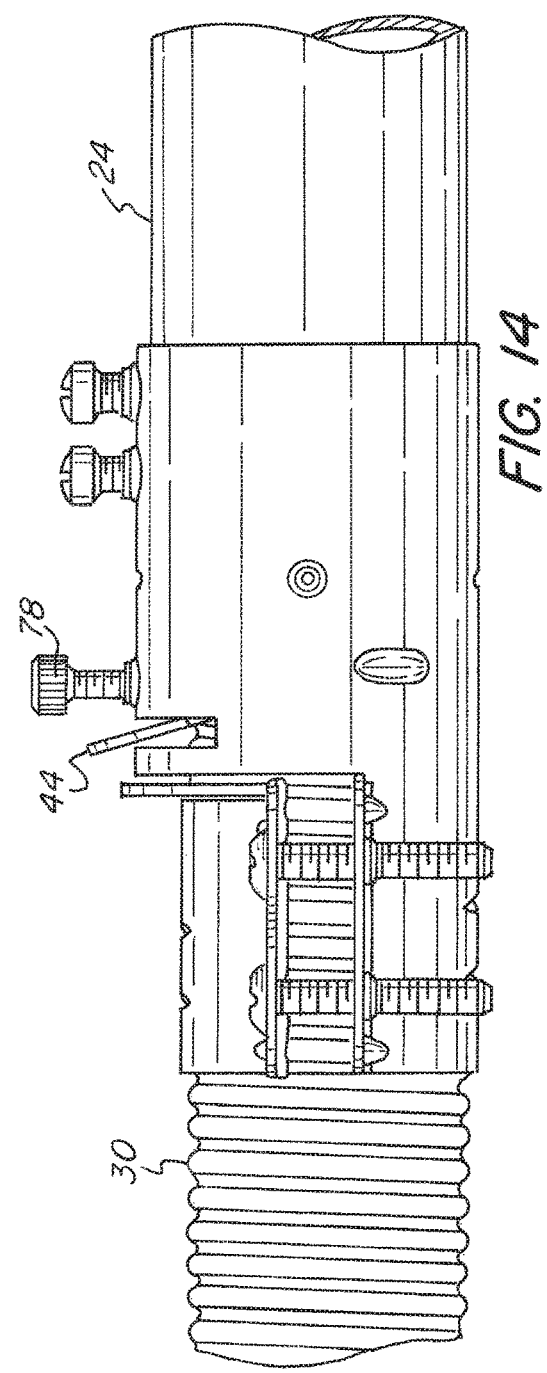
FIG. 14 is a right side view of the transition coupler, AC/MC and EMT/rigid conduit as shown in FIG. 13.

Typically, AC and MC has a bundle 63 of electrical conductors 62 formed therewith. The same conductors are also pulled through the EMT or rigid conduit. Both AC and MC have an outer sheath 28 which is corrugated. The AC or MC can have various outer sheath diameters, such as seen in FIGS. 9-12 for a maximum diameter outer sheath and FIGS. 13-15 showing a minimum diameter outer sheath which can be accommodated by coupler 20.

Figure 12:
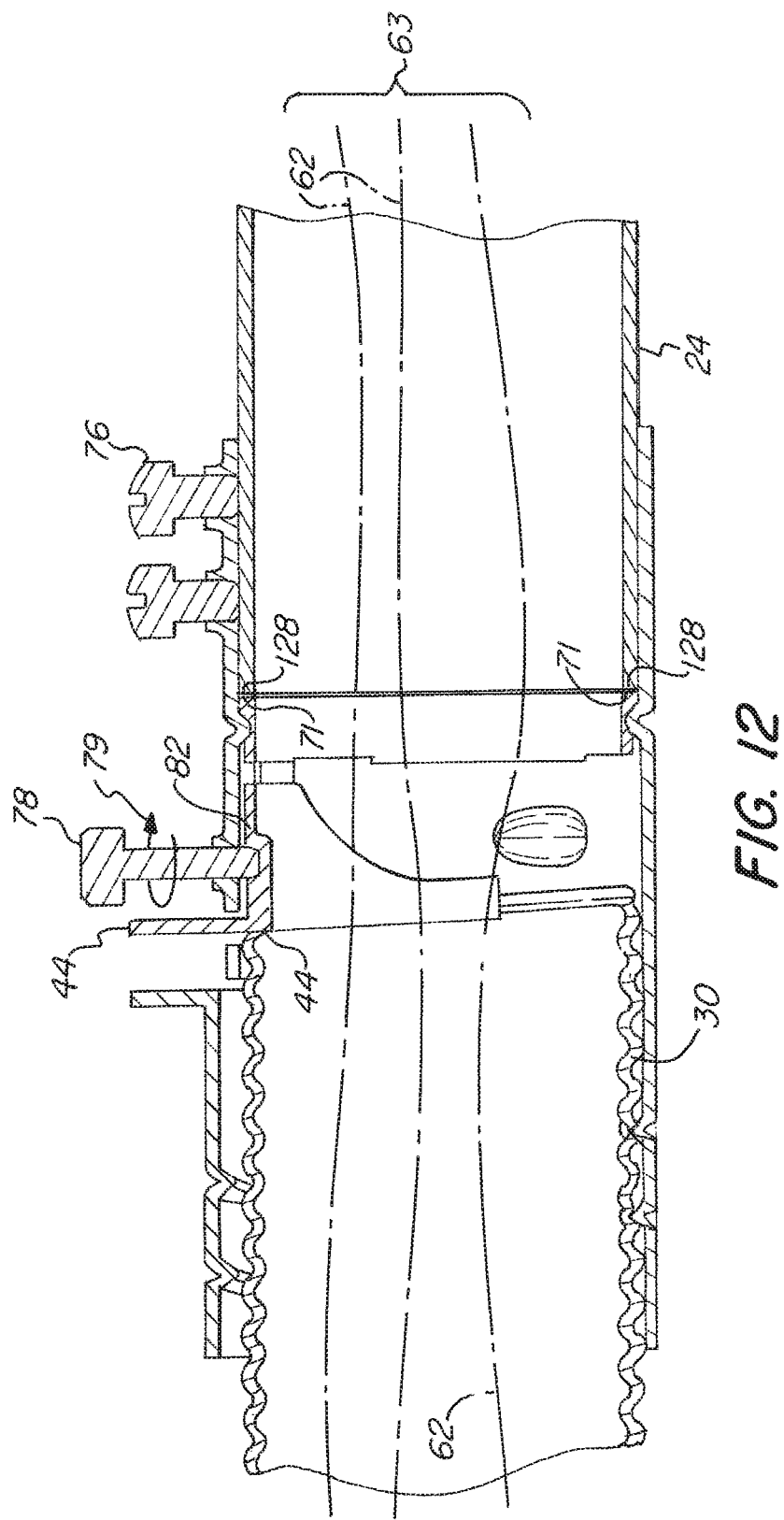
FIG. 12 is a cross-sectional view of the transition coupler, AC/MC and EMT/rigid conduit taken along line 12-12 of FIG. 11.
Figure 15:
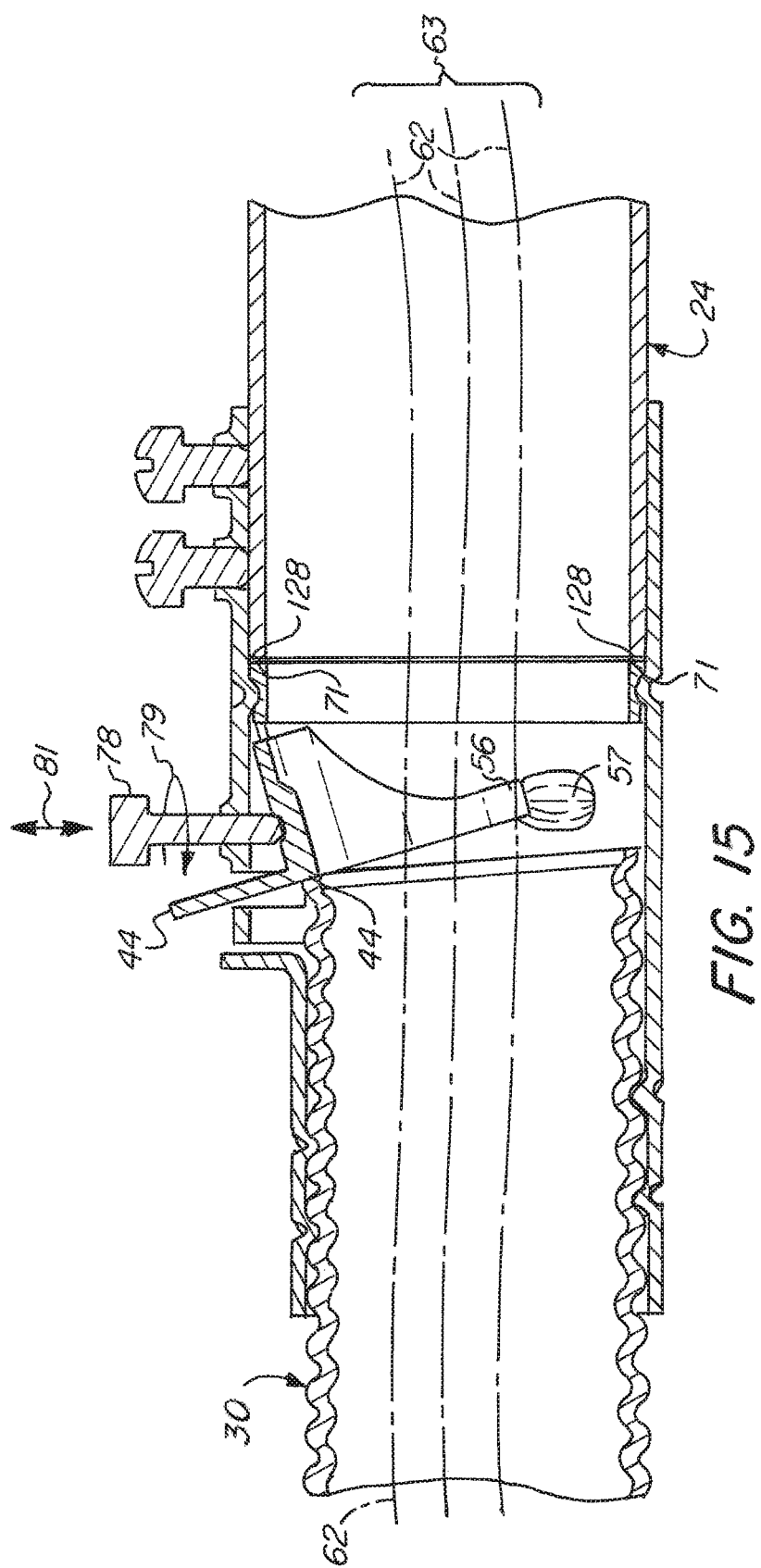
FIG. 15 is a cross-sectional view of the transition coupler taken along line 12-12 of FIG. 11, but showing AC/MC with a minimum outer diameter metal sheath and EMT/rigid conduit secured to the coupler.

As seen in FIGS. 1-15, the outer sheath 28 of AC/MC 30 is secured to the coupler by tightening a strap 40, with the outer sheath 28 contacting a stop plate 44 forming part of insulator 82 as seen in FIG. 12 for a maximum outer diameter cable sheath and FIG. 15 for a minimum outer diameter cable sheath of the AC/MC. In this manner, the electrical conductors 62 are able to freely pass through the coupler after the EMT/rigid conduit 24 is secured to the coupler as explained below.

As seen in FIGS. 1-15, the outer sheath 28 of an AC/MC 30 is secured to the adjustable coupler by tightening strap 40 by means of screws 42, with the outer sheath 28 contacting a stop plate 44 as shown in FIG. 15 for a smaller outer diameter (OD) AC/MC or, as shown in FIG. 12, contacting the stop plate for a large OD AC/MC. This allows electrical conductors 62 of an electrical conductor bundle 63 to pass through the coupler 20 while preventing the sheath from entering cavity 77 of hollow cylindrical section 52 of body 60. The stop plate can be adjusted to accommodate a wide range of outer sheath OD's in a range of ODs while allowing passage of the conductor bundle 63. This is seen in FIG. 15 when turning thumb adjustment screw 78 as shown by turn arrow 79, which causes linear movement to screw 78 as shown by arrow 81, which in turn moves stop plate 44 to various positions (compare FIG. 12 to FIG. 15). Ears 56 depending from curved member 86 of insulator 82 are configured to contact dimples 57 protruding inside hollow cylindrical section 52 when stop plate 44 is configured to contact a minimum diameter outer sheath 28 as shown in FIG. 15. The ears are located on the ends of curved members 86.

As will be described more fully below, the strap 40 in combination with the adjustable stop plate 44 can accommodate a wide selection of outer sheath OD's between maximum and minimum deflection of the stop plate in a simple and straightforward manner.

As also seen in FIGS. 1, 2, 2C and 4, both a curved section 46 of strap 40 and a curved section 64 of extension member 70 include elongated detents 76 for assistance in holding sheath 28 of AC/MC 30 to the overall adjustable coupler 20.

As seen in FIGS. 1, 2 and 3-15, body 60 has a hollow cylindrical section 52 that is configured to receive EMT or rigid conduit 24. The hollow cylindrical section includes one or more threaded bores 53 and mounting screws 55 to secure the AC/MC inserted into the hollow cylindrical section.

As seen in FIGS. 1, 2, 3, 5 and 6, body 60 also includes a slot 72 dimensioned for passage of stop plate 44 of insulator 82. The body 60 also includes a threaded bore 74 for receipt of an adjustment screw 78, thereby providing an easy method for adjusting stop plate 44 depending upon the OD of the AC/MC 30. Indicia 75 can be placed on the hollow cylindrical section 52 to identify the adjustment thumb screw. Body 60 can be fabricated from steel, aluminum or die-cast zinc, or other material which can provide the strength required to hold the AC/MC.

As seen in FIGS. 1, 2, 2A and 2B, the stop plate 44 is part of an insulator 82 and is integrally formed as part of the insulator at a second end 80 of the insulator 82. The insulator also includes a hollow cylindrical bushing 84 and a curved member 86, both for placement within cavity 77 of hollow cylindrical section 52 of body 60. Insulator 82 has a first end 73 on a front face 71 of cylindrical bushing 84. As discussed below, the front face of the cylindrical bushing 84 is configured to contact end 128 of an EMT or rigid conduit 24 installed in cavity 77 of hollow cylindrical section 52 (see FIGS. 12 and 15). The curved member 86 is flexibly attached to the cylindrical member via an integral hinge 85 formed therein. The insulator can be fabricated from any suitable plastic or similar material, such as polypropylene, nylon or other flexible material.

As seen in FIGS. 1, 2, 7 and 9, cylindrical bushing 84 includes a plurality of recesses 67 which are dimensioned for securement to dimples 65 formed in the interior portion of hollow cylindrical section 52 so that when the insulator is inserted into cavity 77 and stop plate 44 protrudes through slot 72, the dimples help maintain the insulator in place and resist movement thereof both longitudinally within the cavity, as well as rotationally within the cavity.

As seen in FIG. 2, adjustment screw 78 passes through bore 74 and contacts a recess 89 formed in curved section 86 of insulator 82.

As seen in FIGS. 1 and 2, stop plate 44 may include indicia 96 to assist in adjustment of the stop plate depending upon the OD of the AC/MC to be inserted within the adjustable connector. The indicia typically show the maximum outer sheath OD of the AC/MC (minimum or zero deflection of the stop plate) to the minimum outer sheath OD of the AC/MC that can be accommodated by the coupler (maximum deflection of the stop plate)—see FIGS. 9-15.

As seen in FIGS. 1 and 2, extension member 70 of body 60 includes a first flange 100, curved section 64 and a second flange 102 attached to the curved section at a second end of the curved section relative to flange 100.

Figure 2C:
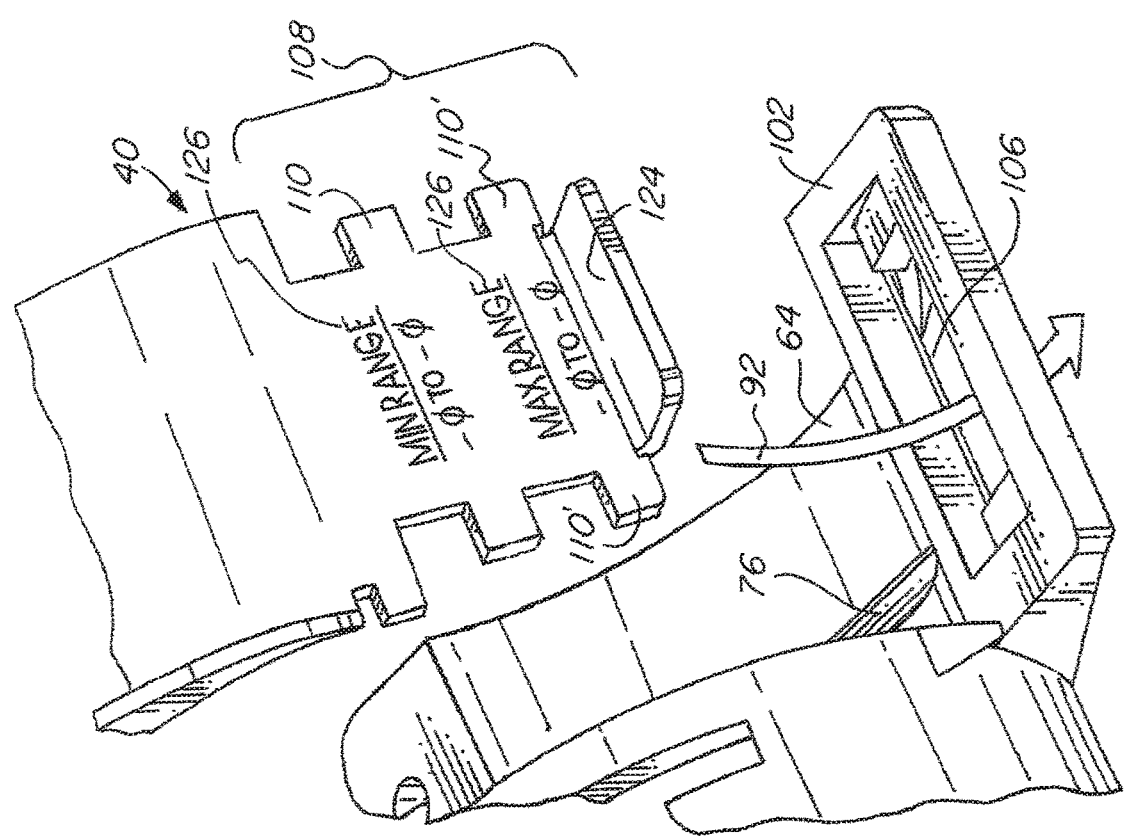
FIG. 2C is a partial enlarged view of a strap forming part of the coupler, where the strap is positioned for insertion through a slot formed in an extension member of a body of the coupler, with an arrow showing the direction for such insertion.
Figure 2D:
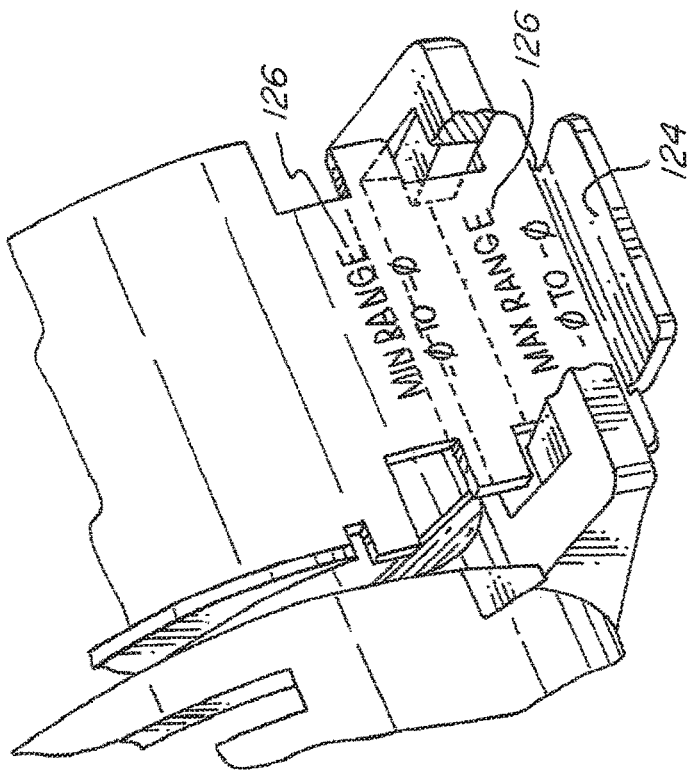
FIG. 2D is a partial enlarged view of the strap positioned in the slot formed in the extension member of the body.
Figure 3:
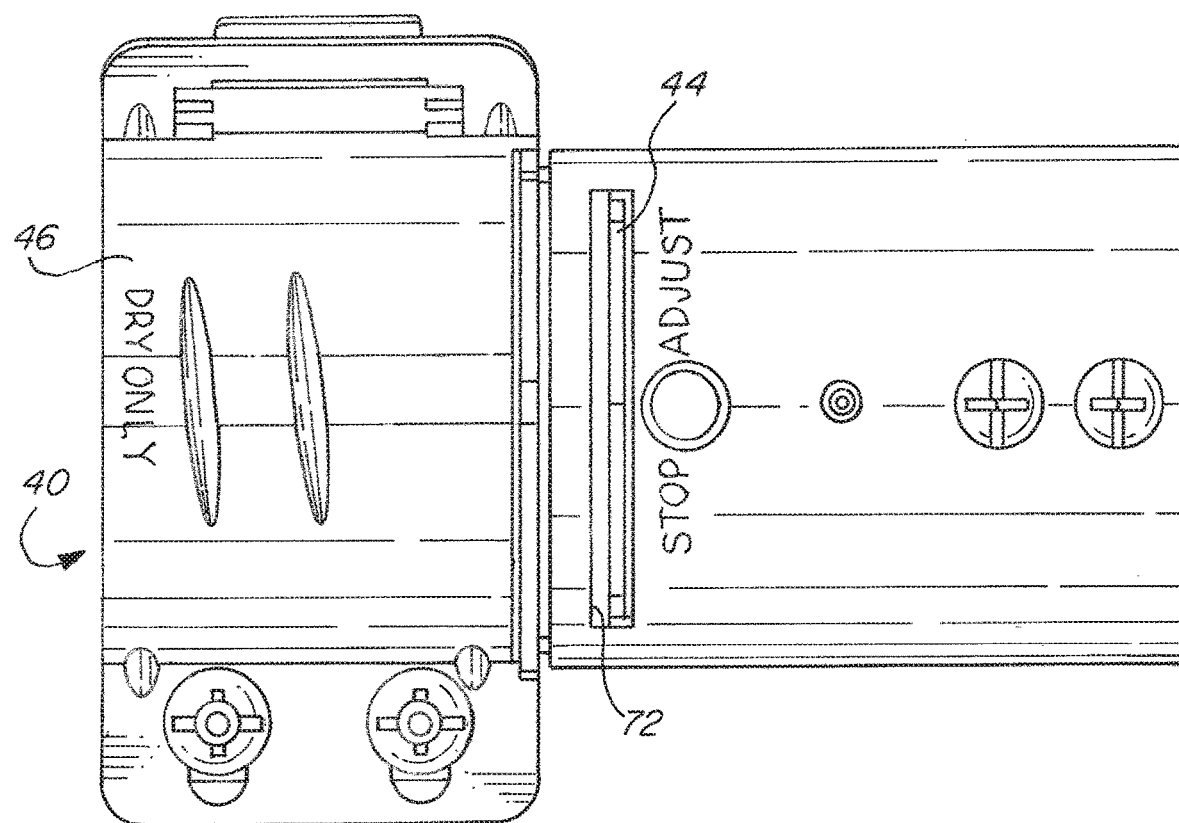
FIG. 3 is a top view of the transition coupler shown in FIG. 1.
Figure 4:
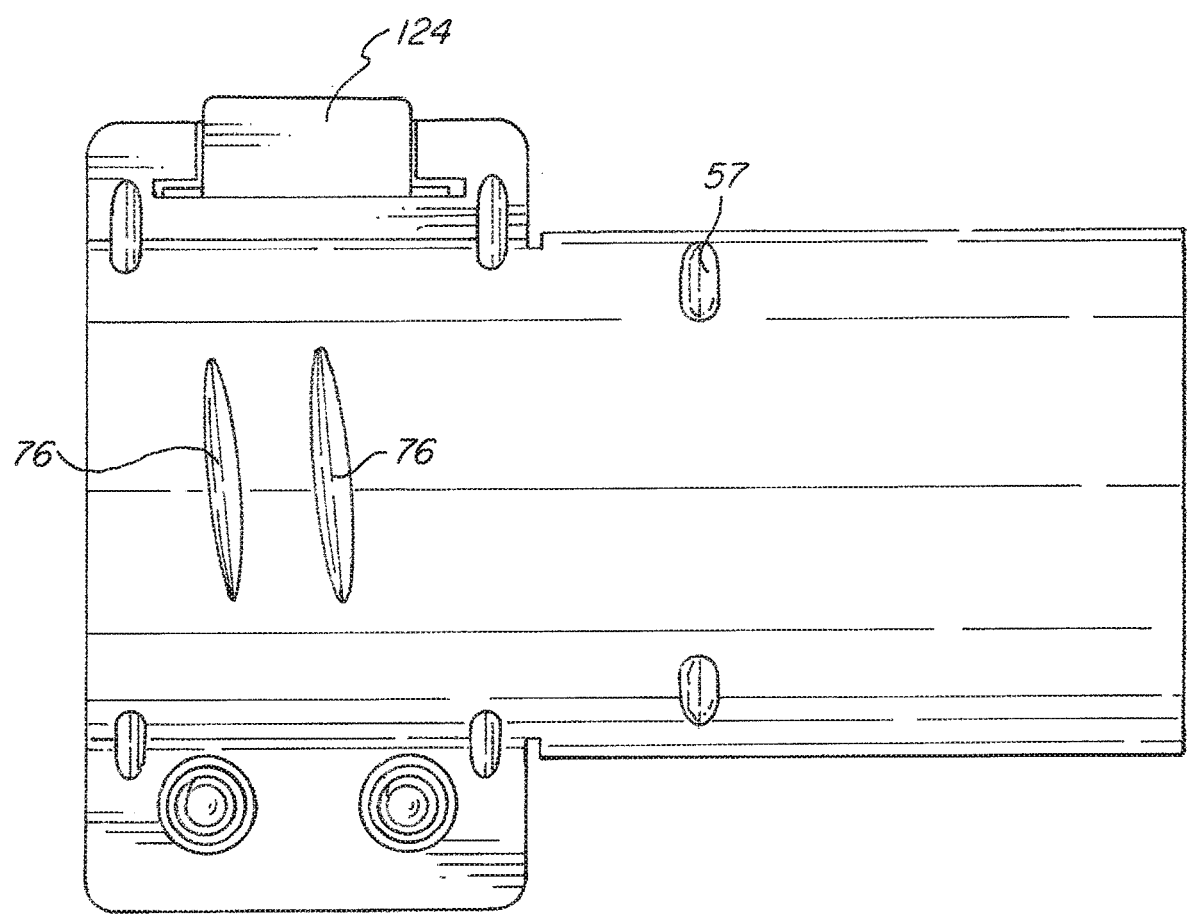
FIG. 4 is a bottom view of the transition coupler shown in FIG. 1.
Figure 5:
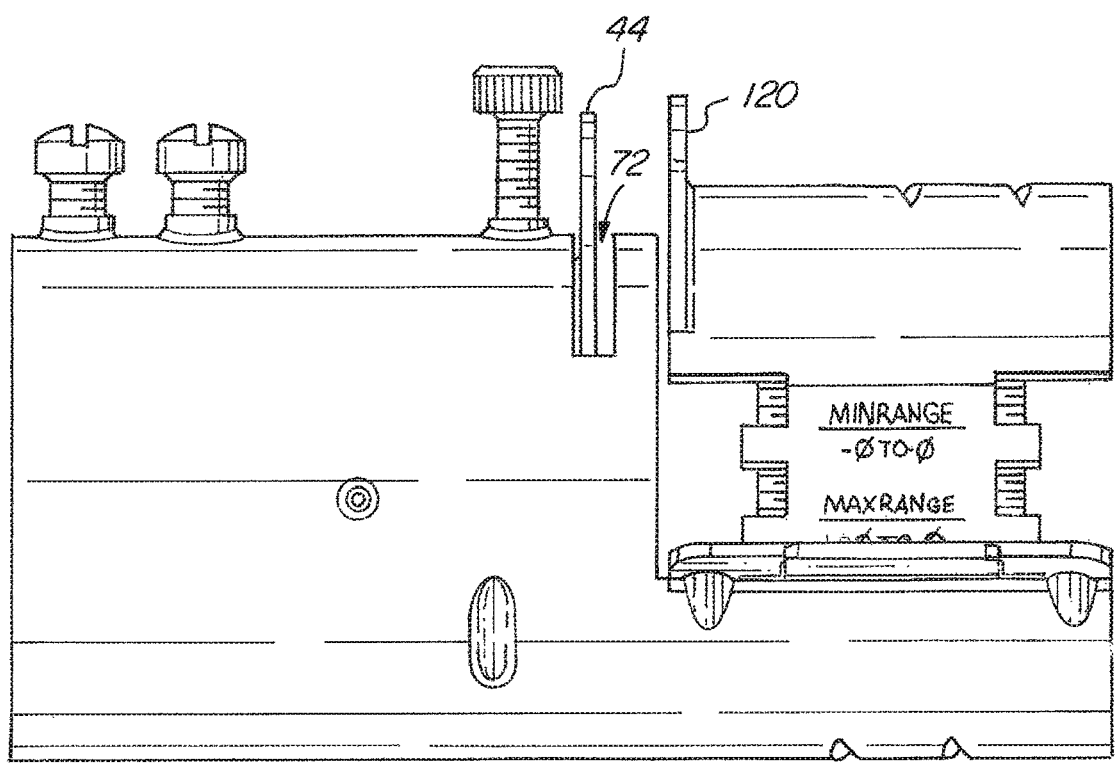
FIG. 5 is a right side of the transition coupler shown in FIG. 1.
Figure 6:
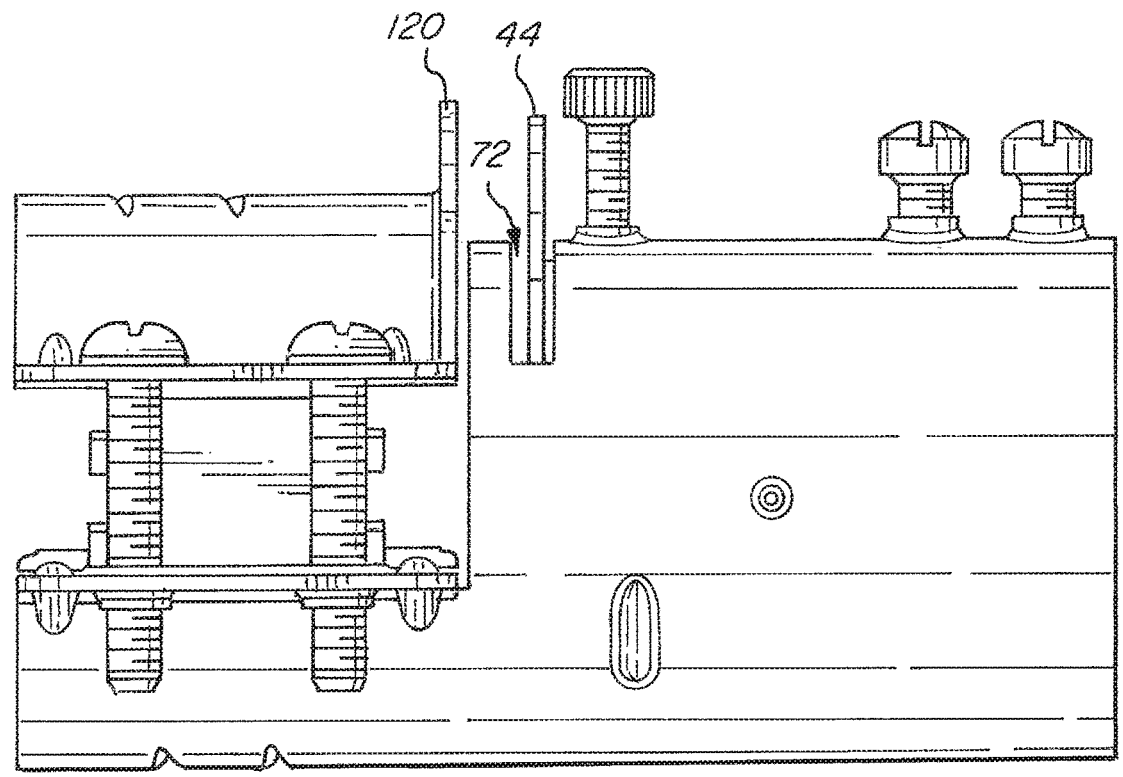
FIG. 6 is a left side view of the transition coupler shown in FIG. 1.
Figure 5A:
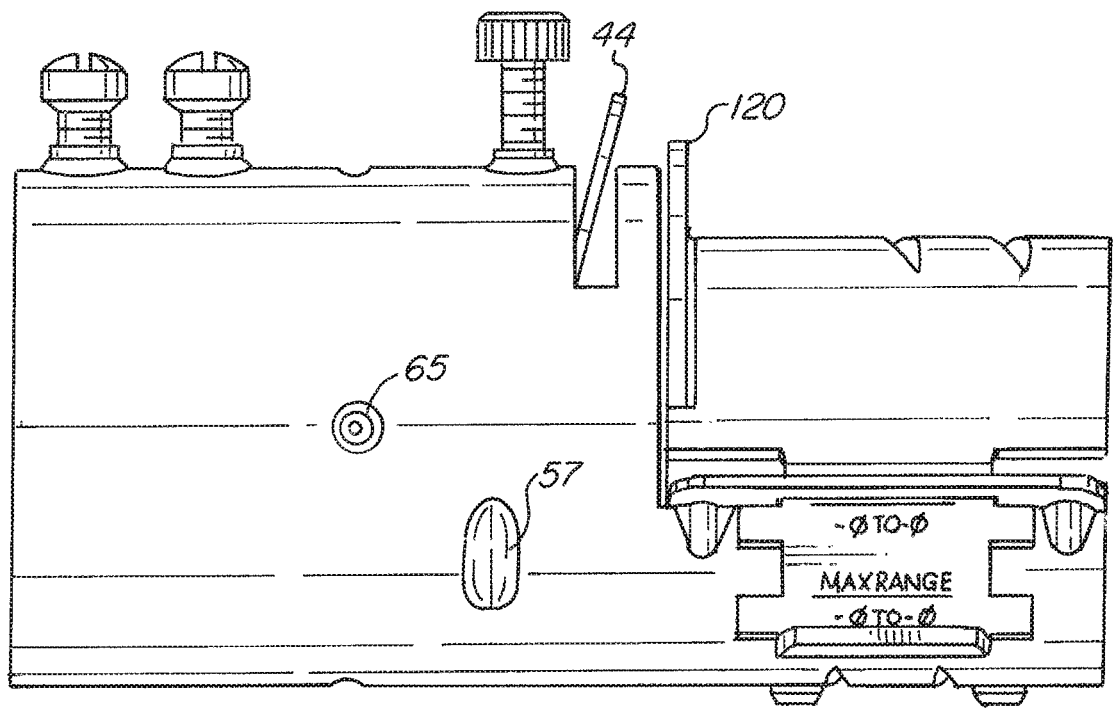
FIG. 5A is a right side view of the transition coupler showing the strap configured for a minimum diameter flexible metallic conduit.
Figure 6A:
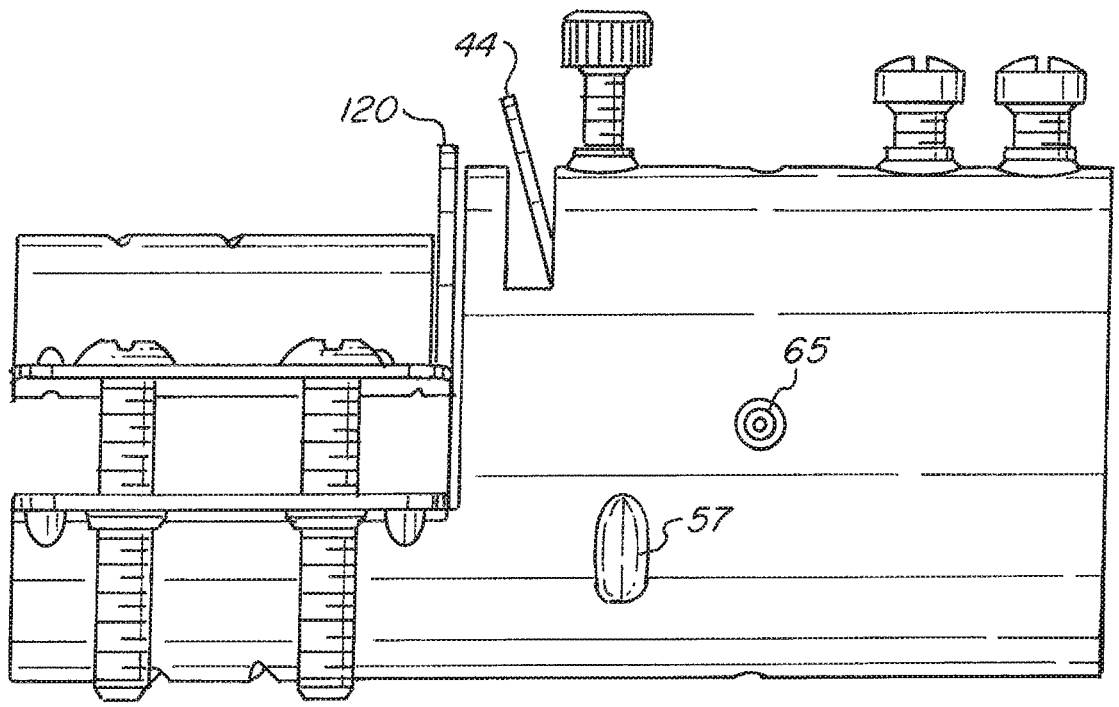
FIG. 6A is a left side view of the transition coupler showing the strap configured for a maximum diameter flexible metallic conduit.

Flange 100 includes threaded bores 104 for receipt of screws 42. Second flange 102 has a slot 106 formed therein for receipt of fingers 110, with the fingers dimensioned for contacting the outer perimeter of the slot as best seen in FIGS. 2C and 2D. Thus, a pair of fingers 110 can be selected depending upon the OD of the AC/MC to be inserted within the adjustable connector.

As seen in FIGS. 1 and 2, strap 40 includes a flange 114 having a pair of slots 116 formed therein to facilitate passage of screws 42 therethrough. The slots allow sufficient movement of the overall strap relative to extension member 70 to facilitate placement around an AC/MC that is to be inserted within the adjustable connector.

Figure 7:
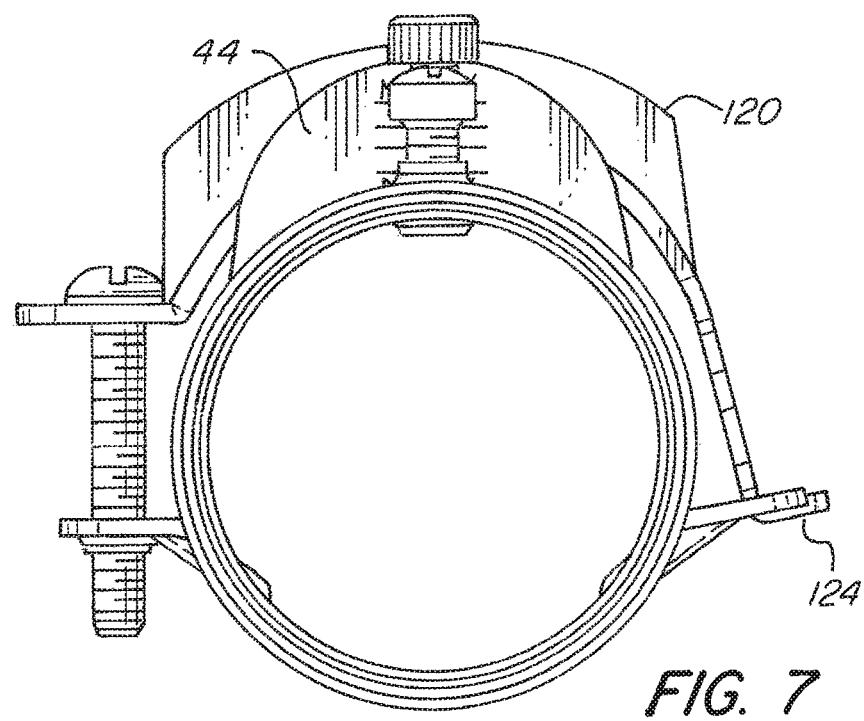
FIG. 7 is a front view of the transition coupler shown in FIG. 1.
Figure 8:
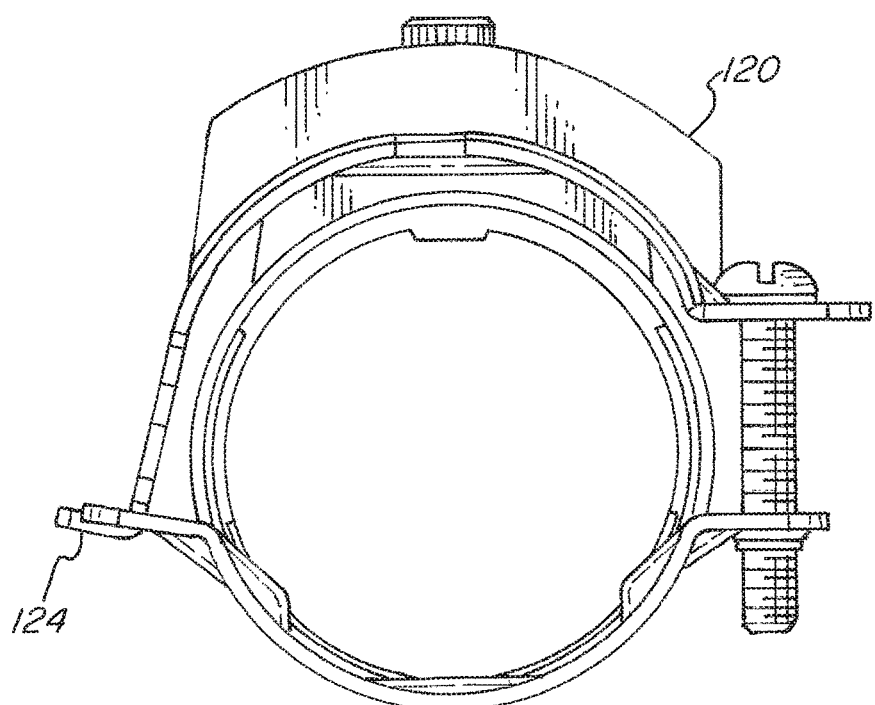
FIG. 8 is a rear view of the transition coupler shown in FIG. 1.

The curved section 46 of strap 40 has an upstanding flange 120 which when installed is placed close to stop plate 44. This is best seen in FIGS. 5, 6, 5A and 6A. The flange covers the space between the strap and body 60 that would otherwise be exposed when the OD of the AC/MC is small. This is seen in FIGS. 7 and 8. Closing this space is required by electrical codes to prevent insertion of extraneous objects into the coupler. Strap 40 further includes flange 114 as discussed above.

As discussed above, strap 40 includes a strap adjustment member 108 that includes a plurality of fingers 110 arranged in pairs (e.g., pair 110'). Each pair is dimensioned so as to be able to pass through slot 106 (by slightly tilting strap 40) and then contacting the outer perimeter of the slot as discussed above. Insertion is shown in FIGS. 2C and 2D by arrow 92. The strap in combination with extension member 70 can thereby accommodate a relatively large range of OD's of the AC/MC.

The strap may also have an extending lip 124 which helps prevent accidental removal of the strap adjustment member from the extension member of the body while positioning the strap about the AC/MC prior to tightening of screws 42.

As seen in FIGS. 2C, 2D and 5-15, the strap 40 can accommodate a wide range of outer sheath 28 ODs associated with the AC/MC to be installed within the transition coupler. Furthermore, as seen in FIGS. 2C and 2D, the portion of the strap 40 associated with fingers 110 may include indicia 126 to assist the installer as to which pair of fingers to use depending upon the OD of the AC/MC outer sheath to be used with the transition coupler. It should be noted that the radius of curvature of curved section 46 of strap 40 and the radius of curvature of curved section 64 of extension 70 of body 60 are similar to the radius of curvature of outer sheath 28 of the AC/MC that can be installed in the adjustable coupler 20.

The overall result of this transition coupler is that it provides a relatively large range of adjustment with respect to the OD of the AC/MC outer sheath to be used within a particular trade size and can accommodate various cable manufacturers combination of outer sheath (armor) OD and conductor bundle sizes. Furthermore, insulator 82 includes an adjustable stop plate 44 which prevents the outer sheath of the AC/MC from entering cavity 77 of hollow cylindrical section 52 while allowing the conductor bundle 63 of the AC/MC to pass through cavity 77. Furthermore, by use of only two screws to secure the strap to the extension member 70, a heavy duty adjustable strap is obtained which is readily secured to the outer sheath of the AC/MC and is in general more convenient to install than straps requiring screws on both sides thereof. Of course, if desired, strap 40 can be secured to extension member 70 by use of screws on both sides of the strap in an embodiment of the strap and extension member shown in FIG. 21 of U.S. Pat. No. 9,373,919, which is hereby incorporated by reference.

The overall transition coupler is therefore easy to install resulting in time savings and therefore less costly installations.

As seen in FIGS. 1, 2A, 2B, 12 and 15, the front face 71 of cylindrical bushing 84 of insulator 82 is dimensioned to contact an end 128 of EMT or rigid conduit 24. Thus, when the insulator is positioned in the manner as shown in FIGS. 12 and 15, the insulator not only provides an adjustment member via a stop plate 44 for preventing insertion of the AC/MC outer sheath past the stop plate (thereby preventing entry of the AC/MC into the cavity 77 of the hollow cylindrical section 52 of body 60), but also through front face 71 of cylindrical bushing 84, prevents the EMT/rigid conduit end 128 from being pushed past cavity 77 into the region of extension member 70 of body 60. Thus, insulator 82 provides an adjustable stop for the AC/MC, as well as a stop against entry of the EMT/rigid conduit into the region associated with the extension member 70.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. An adjustable transition coupler for coupling armored cable (AC) or metal clad cable (MC), the AC/MC having an outer sheath in a range of outer diameters, to either electrical metallic tubing (EMT) or rigid conduit, the transition coupler comprising:

a body with a hollow cylindrical section and an extension member attached to the hollow cylindrical section, the hollow cylindrical section having a slot dimensioned to allow passage of a stop plate, a first threaded bore passing through the hollow cylindrical section for receipt of an adjustment screw, and at least a second threaded bore for receipt of a screw so as to secure EMT/rigid conduit in a cavity of the hollow cylindrical section;

the extension member comprising a first flange with threaded bores formed therein, a curved section attached to the flange at one end of the curved section, and a second flange attached to the curved section at a second end of the curved section, the second flange having a slot formed therethrough;

an insulator having a hollow cylindrical bushing at one end dimensioned to be inserted into the cavity of the hollow cylindrical section of the body, a curved member flexibly attached to the hollow cylindrical bushing, the curved member extending to a second end of the insulator, and a stop plate extending radially outward from the curved member at said second end of the insulator, the stop plate dimensioned for passage in said slot of the body, the stop plate movable by the adjustment screw between a minimum deflection and a maximum deflection, the stop plate configured to stop the AC/MC from passage into the hollow cylindrical section of the body when the AC/MC is positioned in the extension member of the body; wherein the hollow cylindrical bushing of the insulator is configured to stop the EMT or rigid conduit positioned in the hollow cylindrical section of the body from passage into the extension member; and a strap having a flange with slots formed therein, each slot dimensioned to allow passage of a screw for threaded engagement with one of the threaded bores formed in the first flange of the extension member, a curved section having a first end attached to the strap flange, the curved section complementary to the curved section of the extension member, and a strap adjustment member attached to a second end of the strap curved section, the strap adjustment member having a plurality of fingers extending therefrom, the fingers arranged in pairs, each pair of fingers dimensioned so as to be able to pass through the slot of the second flange of the extension member so as to prevent the strap adjustment member from disengaging from said slot, wherein the curved section of the extension member and the curved section of the strap are configured to secure the AC/MC cable, where the AC/MC outer sheath may have different outer diameter sizes in said range of outer diameters, wherein the curved member of the insulator includes depending ears configured to contact dimples protruding inside the hollow cylindrical section of the body when the stop plate is at the maximum deflection.

2. The adjustable transition coupler according to claim 1, wherein the curved member of the insulator includes a recess dimensioned for contact with an end of the adjustment screw to facilitate deflection of the stop plate by deflection of the curved member.

3. The adjustable transition coupler according to claim 1, wherein the body and strap are fabricated from steel or zinc.

4. The adjustable transition coupler according to claim 1, wherein the strap adjustment member of the strap includes indicia indicating a maximum and minimum range of sheath outer diameter sizes associated with an AC/MC that can be connected to the electrical connector.

5. The adjustable transition coupler according to claim 1, wherein the curved section of the extension member and the curved section of the strap each include detents for facilitating securement to the outer sheath of the AC/MC.

6. The adjustable transition coupler according to claim 1, wherein the curved section of the strap includes an upstanding flange protruding radially outward from one end of the curved section so as to help prevent entry of extraneous material into the cavity of the hollow cylindrical section of the body of the coupler when the strap is adjusted between a maximum and minimum outer diameter for the associated AC/MC.

7. The adjustable transition coupler according to claim 1, wherein the strap adjustment member includes a lip extending from an end of the strap adjustment member, the lip to facilitate preventing the strap adjustment member from pulling out of the slot in the second flange of the body during adjustment of the strap.

8. The adjustable transition coupler according to claim 1, wherein the stop plate includes indicia indicating the amount of deflection of the stop plate.

9. The adjustable transition coupler according to claim 8, wherein the insulator is fabricated form an electrical insulating material.

10. The adjustable transition coupler according to claim 9, wherein the electrical insulating material is polypropylene or nylon.

11. The adjustable transition coupler according to claim 1, wherein the hollow cylindrical section of the body has indicia near the first threaded bore to identify the adjustment screw.

12. The adjustable transition coupler according to claim 1, wherein the adjustment screw is a thumb adjustment screw.

\* \* \* \* \*